United States Patent [19]
Takahashi et al.

[11] 3,778,081
[45] Dec. 11, 1973

[54] AUTOMATIC CONTROL SYSTEM TO PROVIDE STABILITY TO A VEHICLE

[75] Inventors: Noriyuki Takahashi, Tokyo; Hidehiko Inoue, Oimachi; Yoshihiko Toshimitsu, Tokyo, all of Japan

[73] Assignee: Honda Giken Kogyo Kabushiki Kaisha, Tokyo, Japan

[22] Filed: May 10, 1972

[21] Appl. No.: 252,029

[30] Foreign Application Priority Data
May 12, 1971   Japan.............................. 46/31188

[52] U.S. Cl. .......... 280/112 A, 280/124 F, 280/6 H
[51] Int. Cl. .......................................... B60g 11/28
[58] Field of Search.................... 280/6, 6 H, 6.1, 280/124 F, 112 R, 112 A

[56] References Cited
UNITED STATES PATENTS
3,002,765   10/1961   MacDuff ........................ 280/124 F
3,194,581   7/1965   Brueder ......................... 280/112 A

*Primary Examiner*—Philip Goodman
*Attorney*—Eric H. Waters et al.

[57] ABSTRACT

Automatic control system to provide stability to a vehicle, comprising a device which detects centrifugal force generated on the vehicle when it runs along a curved path, and cylinder means including valve and conduit means, the cylinder means being operated by the detecting device so that it adjusts the amount of fluid in one or more pairs of fluid dampers disposed respectively at right-side and left-side portions of the vehicle to incline the latter against rolling motion thereof occurring with the centrifugal force. The operation of the cylinder means is imparted to the detecting device in the form of a force counteracting the centrifugal force, to compensate the amount of fluid in the dampers, whereby the vehicle runs in a stable attitude.

1 Claim, 2 Drawing Figures

AUTOMATIC CONTROL SYSTEM TO PROVIDE STABILITY TO A VEHICLE

BRIEF SUMMARY OF THE INVENTION

The present invention relates to an automatic control system to provide stability to a vehicle such as a motor car, with which the vehicle is able to run along a curved way in a stable running attitude and is comfortable to ride in with a good cushioning effect.

The control systems are known that stability of a vehicle is known that positively compensate the degree of inclination of the vehicles when they are inclined by the centrifugal force on a curved way, to keep the running stability of the vehicle. But such conventional system are not capable to constantly keep the running stability of the vehicle because the body of the vehicle is inclined against the centrifugal force with the system without any restriction.

Therefore, one object of the present invention is to provide an automatic control system of the described kind vehicle which keeps the running attitude of the vehicle in a constant stable condition independently of radius of curvature of the curved way and of the running speed of the vehicle, by automatically compensating excessive inclination against the centrifugal force of the vehicle.

Another object of the present invention is to provide an automatic control system which assures soft cushion effect of the vehicle during the running thereof along a non curved way, with a straddling effect of the vehicle of the occasion of a sudden braking or an acceleration thereof.

Another objects and features of the present invention will be clarified with the following description.

BRIEF DESCRIPTION OF THE DRAWINGS

FIG. 1 is a partially cross-sectional diagramatic view illust-rating an automatic control system according to the present invention and.

DETAILED DESCRIPTION

Figure 1:
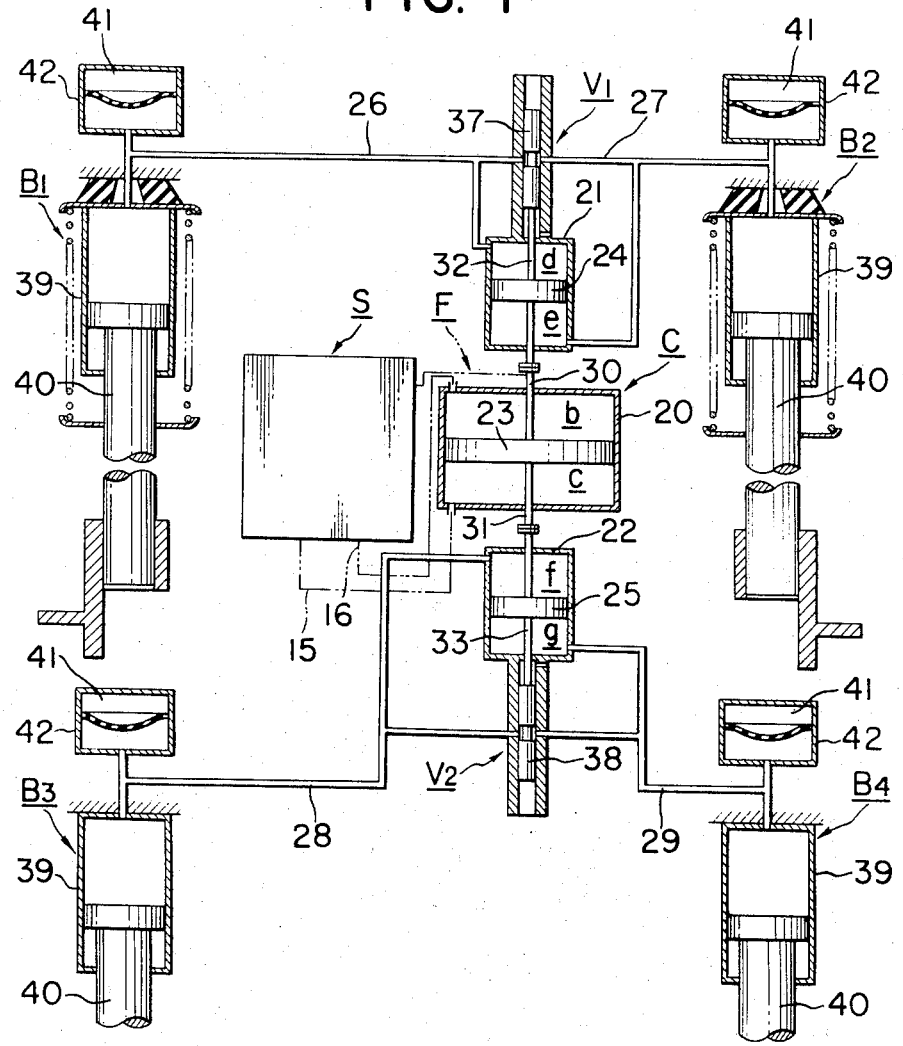

Referring to FIG. 1, therein are seen oil or fluid $B_1$, $B_2$ and $B_3$, $B_4$ respectively for supporting left and right front wheels and rear wheels of a vehicle. The vehicle has a device S which detects the centrifugal force generated on the vehicle when the vehicle runs along a curved way, and transforms the detected centrifugal force into fluid pressure. An or fluid oil cylinder means C is operated by the detecting device S and adjusts the amount of oil or fluid in one or two pairs of oil or fluid dampers $B_1$, $B_2$ and $B_3$, $B_4$, and feedback means F which returns the operation of the cylinder means C to the detecting device S.

Figure 2:
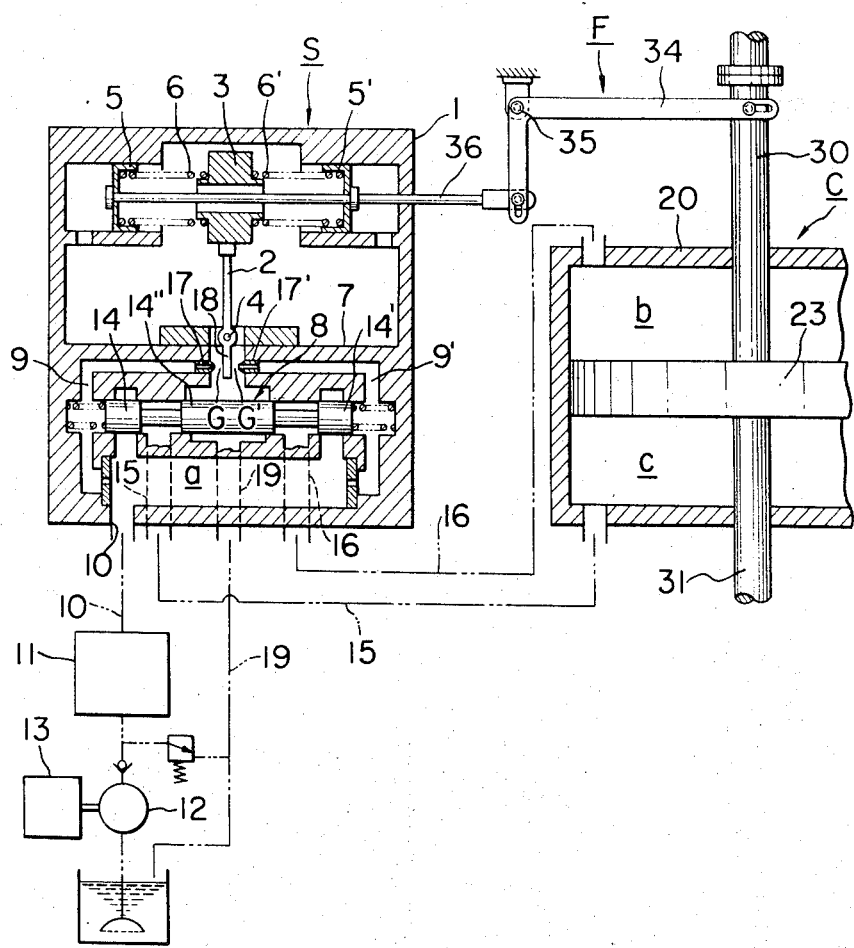
FIG. 2 is a partial cross-sectional enlarged view illustrating a detecting device and an oil cylinder means shown in FIG. 1.

Referring mainly to FIG. 2, the root portion of a control lever 2 is pivotally connected to the middle portion of a housing 1 of the detecting device S with a pivot 4, and the uppermost portion of the control lever 2 is elastically connected to a weight member 3 which slides rightwards or leftwards in response to centrifugal force generated on the vehicle during its running along a curved way.

The weight member 3 is positioned between balancing springs 6, 6' which are held respectively by spring holders 5, 5' each supported by an operation rod 36 of a feedback means F so that the weight member keeps its neutral position under ordinary conditions.

A valve chamber 7 is formed at the lower portion of the inside of the housing 1 and holds a spool valve 8 leftwards and rightwards slidably in it. A high-pressure chamber $a$ is formed in the chamber 7 in connection with a pair of oil or fluid passages 9, 9' formed in the chamber 7, and its is also in connection with a pressure accumulator 11 connected to a pump 12 driven by a chassis engine 13, through a fluid supplying inlet 10 thereof.

Passages between the high-pressure fluid chamber $a$, and conduits 15, 16, respectively connected to an upper chamber $b$ and a lower chamber $c$ of a drive cylinder 20, are closed or opened with piston portions 14, 14' at both end portions of the spool valve 8, while a passage between the conduits 15, 16 and a returning conduit 19 are closed or opened with a piston portion 14'' at the central portion of the spool valve 8.

At the end portions of the oil way passages 9, and 9', a pair of jet nozzles 17, 17' is disposed so that the latter is positioned face-to-face, with a little gap between the nozzles. Between these nozzles, a controlling portion 18 at the lowermost portion of the control lever 2 is positioned so that it receives the impact of oil or fluid discharged by the nozzles 17, 17'. Pressure in the passages 9, 9' is equal when gaps G and G' between the controlling portion 18 and nozzles 17, 17' is equal. Fluid discharged from the nozzles 17, 17' is returned to a tank through a return conduit 19.

Referring again to FIG. 1, the cylinder C is comprised of a drive cylinder 20, an upper operating cylinder 21 and a lower operating cylinder 22 the inside space of the drive cylinder 20 is divided into two parts with a drive piston 23. One of them is the upper chamber $b$ in conjunction with conduit 16, and the other is the lower oil chamber $c$ in conjunction with the conduit 15.

An operating piston 24 of the upper operation cylinder 21 defines an upper fluid chamber $d$ in conjunction with the damper $B_1$ through a conduit 26 and a lower chamber $e$ in conjunction with the damper $B_2$ through a conduit 27, in an upper operating cylinder 21, while an operating piston 25 defines an upper chamber $f$ in conjunction with the oil damper $B_3$ through a conduit 28 and a lower oil chamber $g$ in conjunction with the damper $B_4$ through a conduit 29, in the lower operating cylinder 22.

The pistons 24, 25 are respectively connected to the piston 23 with piston rods 30, 31 to move in the same direction with the piston 23.

Each of the piston rods 30, 31 is outwardly elongated 32, 23 from the operating pistons 24, 25 respectively and has a valve 37 of valve means $V_1$ between the conduit 26, 27 and a valve 38 of valve means $V_2$ between the conduit 28, 29, each at its free end. These valves 37, 38 respectively close or open the passages between the conduits 26, 27 and 28, 29, respectively, be being moved with the operating pistons 24, 25.

In FIG. 2, the feedback means F is comprised of a bellcrank 34 pivotally supported with a pivot 35 and an operating rod 36 the outer end portion of which is pivotally connected to the root end portion of the crank 34. The other end portion of the crank 34 is pivotally connected to the piston rod 30 of the cylinder C. The operating rod 36 is slidably inserted into the detecting device S and is connected to the weight member 3 through the balancing springs 6, 6'.

The dampers $B_1$, $B_2$, $B_3$ and $B_4$ shown in FIG. 1 are known. A damper cylinder 39 is connected to the body of the vehicle while a the piston rod 40 piston portion of which is inside the cylinder 39 is connected to a wheel means. And an auxiliary damper 42 having an air chamber 41 is connected to the damper cylinder 39.

If the vehicle runs along a leftwardly curved way, the centrifugal force generated on the vehicle forces the vehicle to incline rightwards. At this time, the weight member 3 of the detecting device S is enforced to move rightwards in FIG. 2 by the centrifugal force. The controlling postion 18 of the control lever 2 is thus turned clockwise about the pivot 4 to reduce the gap G and extend the gap G', whereby pressure in the left side oil passage 9 is increased because jet resistance at the nozzle 17 is increased, and oil pressure in the right-side passage 9' is decreased because the jet resistance at the nozzle 17' is decreased.

Thus, the spool valve 8 is moved rightwards to connect the high-pressure chamber a to the conduit 16, and to connect the conduit 15 to the returning conduit 19, whereby high pressure fluid enters the upper oil chamber b of the drive cylinder 20 and fluid in the lower oil chamber c flows into the returning conduit 19. Accordingly, the drive piston 23 and the operation pistons 24, 25 are so moved downwards that the valves 37 and 38 respectively shut up the ways between the conduits 26 and 27, and between the conduits 28 and 29. And in the lower chambers e and g of the operation cylinders 21, 22 flow into the right side dampers $B_2$, $B_4$ respectively through the conduits 27 and 29, to elongate the dampers $B_2$ and $B_4$ by increasing the amount of fluid in the dampers $B_2$ and $B_4$, while the fluid in the left side dampers $B_1$ and $B_3$ flows into the upper chamber d and f of the operating cylinders 21 and 22 respectively through the conduits 26 and 28.

Thus, the right-side portion, that is the outer side portion of the body of the vehicle, is lifted in a curved way or maintained at a constant level, whereby the rolling motion of the vehicle generated by the centrifugal force acting thereon is properly compensated.

Although, if centrifugal force acts on the body of the vehicle for a long time, the vehicle will incline excessively and lose its running stability because the dampers at outer side of the vehicle will be elongated in a curved way without any restriction. For this reason the feedback means F is necessary. In FIG. 2, if the drive piston 23 is moved downwards, the bellcrank 34 of the feedback means F is turned clockwise about the pivot 35 to move the operating rod 36 leftwards, whereby it moves the weight member 3 leftwards, that is, against the direction of the centrifugal force, with the balancing spring 6'.

Accordingly, the controlling portion 18 returns toward its neutral position within limits of compensated displacement, whereby the amount of fluid supplied in the upper chamber b of the drive cylinder 20 is decreased, and the amount of fluid supplied into the outer-side dampers $B_2$, $B_4$ and the amount of fluid sucked from the inner-side dampers $B_1$, $B_3$ are compensated. Thus, the body of the vehicle is maintained at its most stable running attitude.

If the vehicle runs along a rightwardly curved way, the weight member 3 will be moved leftwards by the centrifugal force generated on the vehicle, and the outer-side oil dampers $B_1$, $B_3$ are elongated while the inner-side oil dampers $B_2$, $B_4$ are shortened.

While the vehicle runs along a straight way, no centrifugal force acts on the latter and therefore the weight member 3 is at its neutral position as showed in FIG. 2, and the gap G is equal with the gap G' in their distance. The spool valve 8 is also at its neutral position because pressure in the oil passage 9, 9' is equal, whereby the passage ways between the high-pressure chamber a and the conduits 15, 16 are closed with the piston portions 14, 14' of the spool valve 8, and fluid in the high pressure chamber a is returned to the tank through the passage 9, 9' and the returning conduit 19. Consequently the cylinder C is kept at its neutral position as shown in FIG. 1.

Accordingly, the valve means $V_1$ and $V_2$ open the passage 26, 27, and between the conduits 28, 29 respectively, and then the chamber of the damper $B_1$ is connected to that of the oil damper $B_2$ while the oil chamber of the oil damper $B_3$ is connected to that of the damper $B_4$. Therefore, each pair of dampers $B_1$, $B_2$ or $B_3$, $B_4$ bears an equal pressure if one of each pair of dampers $B_1$, $B_2$ or $B_3$, $B_4$ receive force with a concave or a convex surface of a road. Thus, a soft cushioning effect of the vehicle is achieved by damping any rolling or vertical motion of the vehicle as it runs running along a straight way.

What is claimed is:

1. An automatic control system to provide stability to a vehicle, comprising: a mechanism for detecting centrifugal force generated on the vehicle when the same runs along a curved path, and for transforming the detected centrifugal force into fluid pressure; a fluid cylinder operated by said detecting mechanism, for adjusting the amount of fluid in at least one pair of fluid dampers disposed on side portions of the vehicle to incline the latter against rolling motion thereof occurring with the centrifugal force; and feedback means connected to said detecting mechanism and to said cylinder, for transferring the operation of said cylinder to said detecting mechanism in the form of a force counteracting the centrifugal force, to compensate the amount of fluid in said dampers, whereby the vehicle runs in a stable attitude; wherein said cylinder has at least one valve means and at least one respective fluid conduit, connecting said dampers, said valve means closing said conduit during the operation of said cylinder and keeping said conduit connected when said cylinder is not in operation.

* * * * *